United States Patent
Lee

(10) Patent No.: US 10,120,634 B2
(45) Date of Patent: Nov. 6, 2018

(54) LED DISPLAY DEVICE

(71) Applicant: ANPEC ELECTRONICS CORPORATION, Hsinchu (TW)

(72) Inventor: Hung-Ping Lee, Taoyuan (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 230 days.

(21) Appl. No.: 15/279,556

(22) Filed: Sep. 29, 2016

(65) Prior Publication Data

US 2018/0011677 A1    Jan. 11, 2018

(30) Foreign Application Priority Data

Jul. 11, 2016  (TW) .............................. 105121750 A

(51) Int. Cl.
  *G06F 3/14*     (2006.01)
  *G09G 3/32*     (2016.01)
  *G09G 3/3208*   (2016.01)

(52) U.S. Cl.
  CPC ............ *G06F 3/1446* (2013.01); *G09G 3/32* (2013.01); *G09G 3/3208* (2013.01); *G09G 2300/026* (2013.01); *G09G 2310/0297* (2013.01); *G09G 2310/08* (2013.01); *G09G 2320/0252* (2013.01); *G09G 2350/00* (2013.01); *G09G 2352/00* (2013.01); *G09G 2360/04* (2013.01); *G09G 2370/00* (2013.01); *G09G 2370/16* (2013.01)

(58) Field of Classification Search
  CPC ...... G09G 3/32–3/3216; G09G 3/3625; G09G 2300/02; G09G 2300/026; G06F 3/1446
  See application file for complete search history.

(56) References Cited

U.S. PATENT DOCUMENTS

| 6,501,441 | B1  | 12/2002 | Ludtke et al. | |
|---|---|---|---|---|
| 6,972,743 | B2 * | 12/2005 | Kim ...................... | G09G 3/3216 345/76 |
| 7,102,601 | B2 * | 9/2006 | Devos ................... | G06F 3/1446 257/88 |
| 7,471,276 | B2 * | 12/2008 | Tomohara ................ | G09G 3/20 345/213 |
| 7,995,002 | B2 * | 8/2011 | Miller .................. | G09G 3/3216 345/1.3 |
| 8,184,114 | B2 * | 5/2012 | Oh ........................ | G06F 3/1446 345/1.1 |
| 8,810,479 | B2 * | 8/2014 | Kim ...................... | G06F 3/1431 345/1.3 |
| 8,896,637 | B2 * | 11/2014 | Tagawa ................ | G09G 3/2003 345/212 |

(Continued)

FOREIGN PATENT DOCUMENTS

TW           200608328           3/2006

*Primary Examiner* — Patrick F Marinelli
(74) *Attorney, Agent, or Firm* — Li & Cai Intellectual Property (USA) Office

(57) ABSTRACT

The present disclosure provides an LED display device. The LED display device divides each of LED modules into a plurality of unit blocks. In each of the unit blocks, a display controller transmits image data to be processed in parallel to the corresponding data driver at the same time, and transmits logic signals to the corresponding gate driver, thereby driving the corresponding data driver and then turning on the corresponding LEDs. Therefore, the speed processing the image data of each unit block can be improved, to enhance the visual refresh rate.

10 Claims, 4 Drawing Sheets

(56) References Cited

U.S. PATENT DOCUMENTS

| | | | | |
|---|---|---|---|---|
| 9,400,627 B2* | 7/2016 | Han | ............................ | G06F 3/14 |
| 9,524,666 B2* | 12/2016 | Hochman | ............. | G09G 3/3216 |
| 9,530,347 B2* | 12/2016 | Hochman | ............. | G09G 3/3216 |
| 9,558,721 B2* | 1/2017 | Sakariya | ..................... | G06F 3/14 |
| 9,684,482 B2* | 6/2017 | Zeng | ..................... | G06F 3/1431 |
| 2004/0007987 A1* | 1/2004 | Kim | ..................... | G09G 3/3216 |
| | | | | 315/169.2 |
| 2004/0233125 A1* | 11/2004 | Tanghe | ................. | G06F 3/1446 |
| | | | | 345/1.3 |
| 2005/0017922 A1* | 1/2005 | Devos | .................. | G09G 3/3216 |
| | | | | 345/6 |
| 2005/0052373 A1* | 3/2005 | Devos | .................. | G06F 3/1446 |
| | | | | 345/82 |
| 2005/0052375 A1* | 3/2005 | Devos | .................. | G06F 3/1446 |
| | | | | 345/82 |
| 2005/0190127 A1* | 9/2005 | Tomohara | .................. | G09G 3/20 |
| | | | | 345/76 |
| 2006/0038501 A1* | 2/2006 | Koyama | .............. | G09G 3/3216 |
| | | | | 315/169.3 |
| 2006/0208658 A1* | 9/2006 | Kim | ..................... | G09G 3/3216 |
| | | | | 315/169.3 |
| 2009/0073079 A1* | 3/2009 | Miller | .................. | G09G 3/3216 |
| | | | | 345/1.3 |
| 2009/0096711 A1* | 4/2009 | Jang | ...................... | G06F 3/1446 |
| | | | | 345/1.3 |
| 2010/0128020 A1* | 5/2010 | Oh | ......................... | G06F 3/1446 |
| | | | | 345/213 |
| 2010/0134384 A1* | 6/2010 | Kim | ..................... | G06F 3/1431 |
| | | | | 345/1.3 |
| 2011/0080434 A1* | 4/2011 | Tagawa | ................ | G09G 3/2003 |
| | | | | 345/690 |
| 2016/0163256 A1* | 6/2016 | Hochman | ............ | G09G 3/3216 |
| | | | | 345/76 |
| 2016/0163773 A1* | 6/2016 | Hochman | ............ | G09G 3/3216 |
| | | | | 257/40 |
| 2016/0335039 A1* | 11/2016 | Cho | ...................... | G06F 3/1446 |
| 2017/0301312 A9* | 10/2017 | Li | ............................ | G09G 5/12 |
| 2018/0011677 A1* | 1/2018 | Lee | ....................... | G06F 3/1446 |

* cited by examiner

LED DISPLAY DEVICE

BACKGROUND

1. Technical Field

The present disclosure relates to an LED display device, in particular, to an LED display device for enhancing the visual refresh rate.

2. Description of Related Art

When the present LED display device is applied to the large screen, a plurality of display devices are arranged in a matrix to form the large screen, e.g., the traditional TV wall uses the combination of the display devices to display a large image. The traditional TV wall needs a processor to process image data, and then transmits the image to be displayed into the individual display devices, so that the display devices accordingly display the same or a different image.

However, with a substantial increase of the image resolution, each display device processes more and more image data. This decreases the display speed, influencing the visual refresh rate. If the LED display device can improve the speed of processing the image data of each display device simultaneously, it can efficiently enhance the visual refresh rate.

SUMMARY

Accordingly, an objective of the present disclosure is to provide an LED display device, which divides each of the LED modules into a plurality of unit blocks. In each of the unit blocks, a display controller transmits image data to be processed in parallel to the corresponding data driver at the same time, and transmits logic signals to the corresponding gate driver, thereby driving the corresponding data driver and then turning on the corresponding LEDs. Therefore, the speed of processing the image data of each unit block can be improved, to enhance the visual refresh rate.

An exemplary embodiment of the present disclosure provides an LED display device. The LED display device receives image data from an image processor. The image data has a plurality of pixels. The LED display device comprises a plurality of LED modules, a transmitter, and a plurality of receivers. The LED modules are configured for displaying at least one partial image data. Each of the LED modules is divided into a plurality of unit blocks. Each unit block has a plurality of gate drivers, a plurality of data drivers, and a display controller. Each gate driver connects to each data driver through an LED. The transmitter is configured for selecting the corresponding pixels according to the at least one partial image data to be displayed on the LED modules and then divides the selected pixels into a plurality of pixel arrays. The pixel arrays respectively correspond to the unit blocks of the LED modules. The receivers are respectively coupled between the transmitter and the corresponding LED module. Each receiver receives the pixel arrays of the corresponding LED module and transmits the pixel arrays to the corresponding unit blocks. In each unit block, the display controller stores the corresponding pixel array and a plurality of logic signals having a time-sequence relationship. The display controller transmits the pixels of the corresponding pixel array in parallel to the data drivers according to the time-sequence relationship. The display controller transmits the logic signals to the gate drivers according to the time-sequence relationship, to drive the corresponding gate driver and to turn-on the corresponding LED. In each unit block, the display controller sets the time-sequence relationship, a resolution of the pixels of the pixel array, or a combination thereof according to an external device.

In order to further understand the techniques, means and effects of the present disclosure, the following detailed descriptions and appended drawings are hereby referred to, such that, and through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Figure 1:
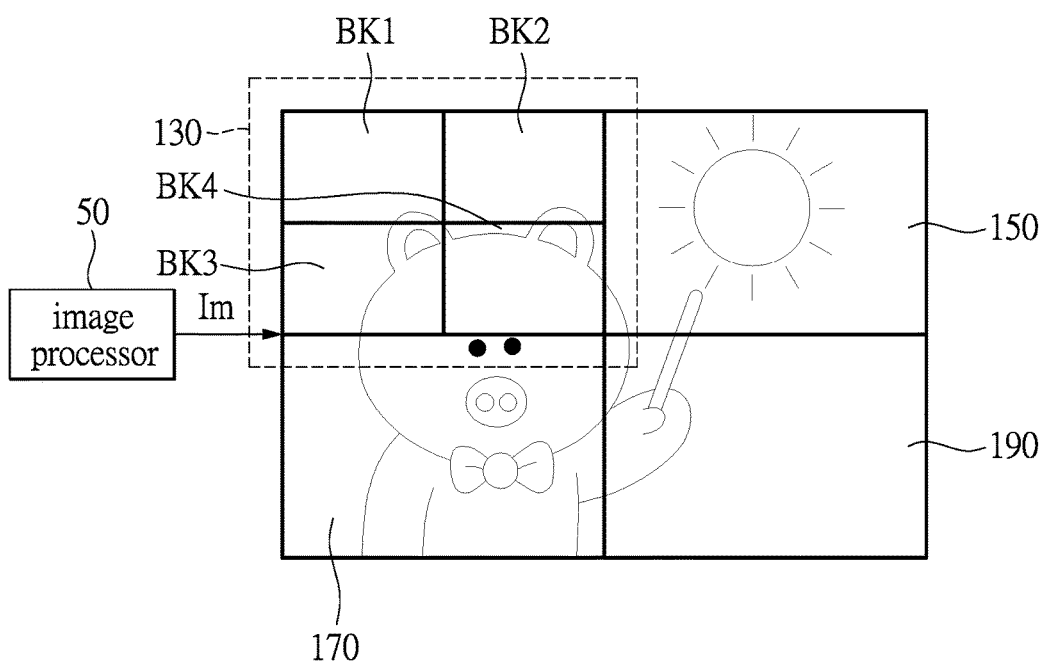
FIG. 1 is a diagram of an LED display device according to an exemplary embodiment of the present disclosure.

Reference will now be made in detail to the exemplary embodiments of the present disclosure, examples of which are illustrated in the accompanying drawings. Wherever possible, the same reference numbers are used in the drawings and the description to refer to the same or like parts.

This embodiment provides an LED display device, which divides each of LED modules into a plurality of unit blocks, to synchronically process at least one partial image data needed to display on the unit block, thereby enhancing the processing speed. Each unit block has a plurality of gate drivers, a plurality of data drivers, and a display controller. Each gate driver connects to each data driver through an LED. The display controller configured in each unit block stores at least one partial image data needed to display on the unit block and logic signals controlling the gate drivers. Each unit block transmits the partial image data needed to display on the unit block in parallel to the data drivers according to the time-sequence relationship. In addition, each unit block transmits the logic signals to the gate drivers according to the time-sequence relationship, to drive the corresponding gate driver and to turn-on the corresponding LED. Accordingly, the speed processing the image data of each unit block can be improved, to enhance the visual refresh rate. The LED display device provided in the exemplary embodiment of the present disclosure will be described in the following paragraphs.

Firstly, please refer to FIG. 1, which shows a diagram of an LED display device according to an exemplary embodiment of the present disclosure. As shown in FIG. 1, an LED display device 100 receives image data Im from an image processor 50. The image data Im has a plurality of pixels, to provide for the LED display device 100 displaying the image data Im according to each pixel. The image processor 50 is used for processing the image data Im, and converts the image data Im into image data suitable for the image format of the LED display device 100, to provide for the LED display device 100 displaying the image data Im. In the present disclosure, the image processor 50 can be a tablet computer, a computer server, a smart phone, an audio player, or other image processor 50, but is not limited hereto. Besides, the connection between the image processor 50 and the LED display device 100 can be wired (e.g., cable) or wireless (e.g., Bluetooth, Infrared light, or wireless networks). Or the connection between the image processor 50 and the LED display device 100 can be wired or wireless through a relay device. Therefore, the image processor 50 and the LED display device 100 can communicate with each other.

Figure 2:
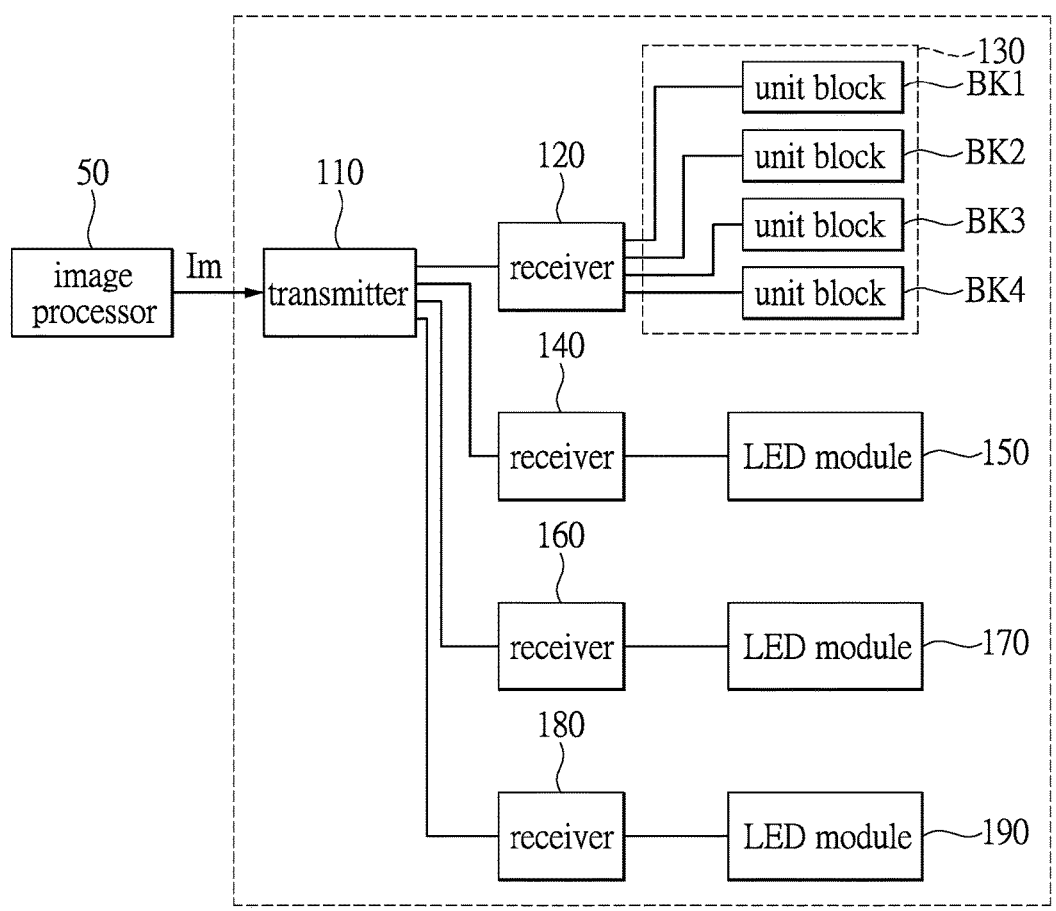
FIG. 2 is a structure diagram of an LED display device according to an exemplary embodiment of the present disclosure.
Figure 3:
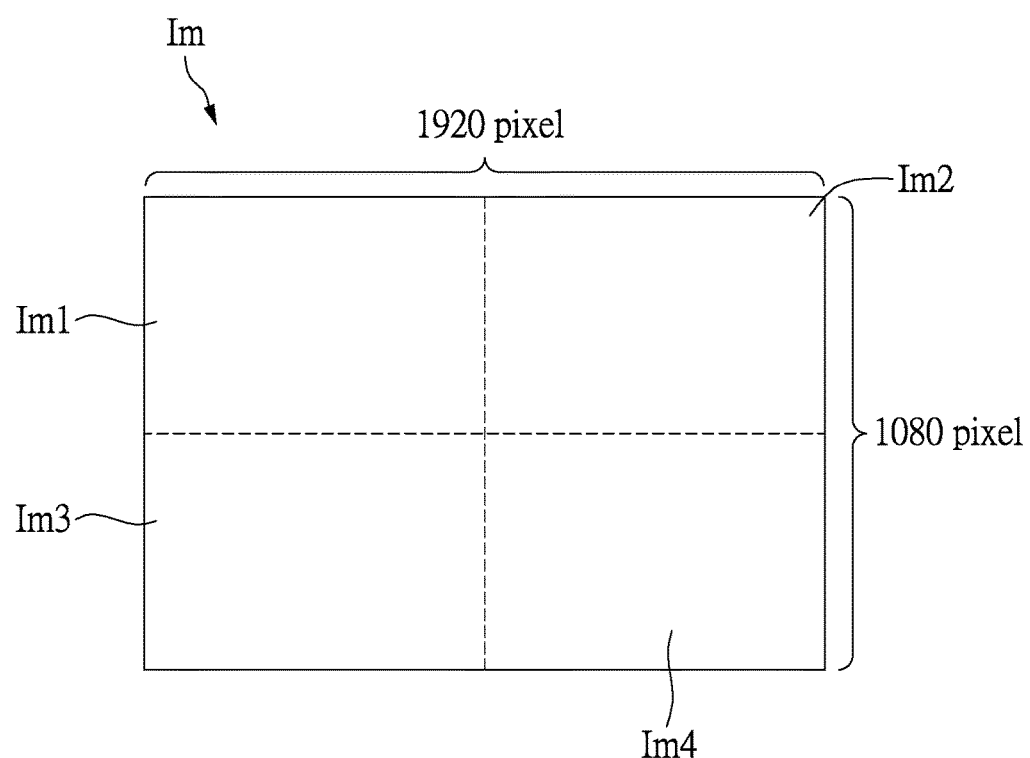
FIG. 3 is a diagram of image data according to an exemplary embodiment of the present disclosure.

Please refer to FIGS. 1-2. The LED display device 100 includes four LED modules 130, 150, 170, and 190, a transmitter 110, and four receivers 120, 140, 160, and 180. The four LED modules 130, 150, 170, and 190 are used to display at least one partial image data respectively. In the present disclosure, the LED modules 130, 150, 170, and 190 display the partial image data respectively, and the combination of the partial image data forms the image data. For example, as shown in FIG. 3, the total image data Im is 1920*1080 pixels. The image data Im is divided into four partial images Im1, Im2, Im3, and Im4. The LED modules 130, 150, 170, and 190 respectively display the partial images Im1, Im2, Im3, and Im4. The LED modules 130, 150, 170, and 190 can be disposed according to the actual conditions, to respectively display the total image data Im or the same partial image. The present embodiment is not limited thereto.

Each LED module 130, 150, 170, and 190 is divided into a plurality of unit blocks. For convenience of description, the following is based on the example of the LED module 130. The LED module 130 is divided into four unit blocks BK1, BK2, BK3, and BK4, to synchronically process the partial image Im1 needed to display on the unit blocks BK1, BK2, BK3, and BK4. Each of unit blocks BK1, BK2, BK3, and BK4 has a plurality of gate drivers, a plurality of data drivers, and a display controller. Each gate driver connects to each data driver through an LED. The following description is based on the example of the unit block BK1.

Figure 4:
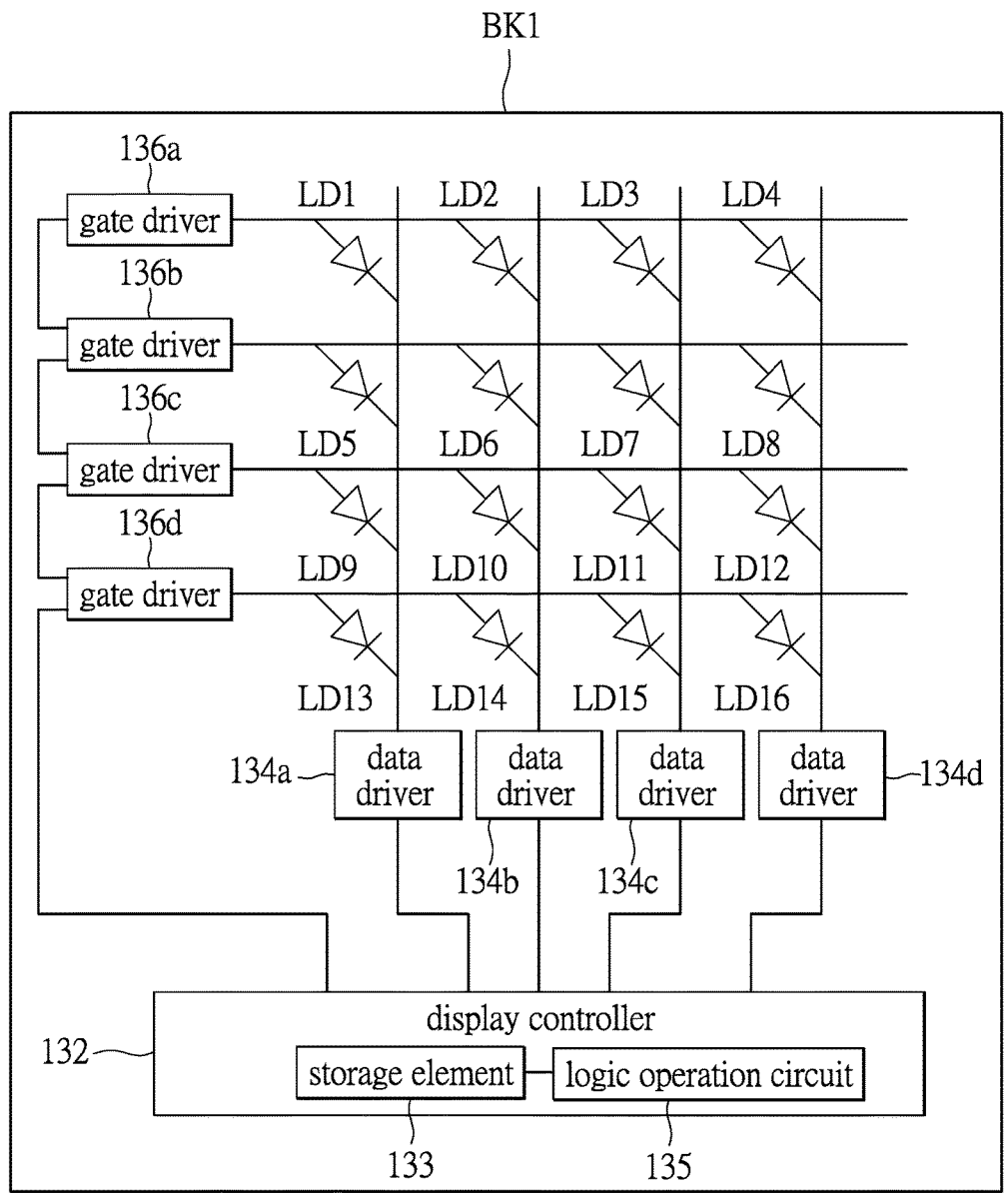
FIG. 4 is a diagram of unit block according to an exemplary embodiment of the present disclosure.

Please refer to FIG. 4 in conjunction with FIGS. 1-3. FIG. 4 shows a diagram of unit block according to an exemplary embodiment of the present disclosure. As shown in FIG. 4, the unit block BK1 has four gate drivers 136a, 136b, 136c, 136d, four data drivers 134a, 134b, 134c, 134d, and a display controller 132. The gate driver 136a connects to the data driver 134a-134d through the LEDs LD1, LD2, LD3, and LD4 respectively. The gate driver 136b connects to the data driver 134a-134d through the LEDs LD5, LD6, LD7, and LD8 respectively. The gate driver 136c connects to the data driver 134a-134d through the LEDs LD9, LD10, LD11, and LD12 respectively. The gate driver 136d connects to the data driver 134a-134d through the LEDs LD13, LD14, LD15, and LD16 respectively.

Please return to FIG. 2, the transmitter 110 selects the corresponding pixels according to the partial image data to be displayed on the LED modules, and divides the selected pixels into a plurality of pixel arrays. The pixel arrays respectively correspond to the unit blocks of the LED modules 130, 150, 170, and 190. Carrying on with the example of FIG. 3, the transmitter 110 selects the corresponding pixels (i.e., all pixels of the partial image Im1, all pixels of the partial image Im2, all pixels of the partial image Im3, and all pixels of the partial image Im4) according to the partial images Im1, Im2, Im3, and Im4 to be displayed on the LED modules 130, 150, 170, and 190. Then the transmitter 110 divides the selected pixels into 16 pixel arrays (i.e., each partial image is divided into 4 pixel arrays). The 16 pixel arrays respectively correspond to the unit blocks BK1, BK2, BK3, and BK4 of the LED modules 130, 150, 170, and 190. For example, the 4 pixel arrays belonging to the partial image Im1 respectively correspond to the unit blocks BK1-BK4 of the LED module 130, the 4 pixel arrays belonging to the partial image Im2 respectively correspond to the 4 unit blocks of the LED module 150, the 4 pixel arrays belonging to the partial image Im3 respectively correspond to the 4 unit blocks of the LED module 170, and the 4 pixel arrays belonging to the partial image Im4 respectively correspond to the 4 unit blocks of the LED module 190. In another embodiment, when the user wants to adjust the partial image data to be displayed on the LED modules 130, 150, 170, and 190, the transmitter 110 can select other pixels by the user controlling an external device (not shown in FIGs). Then the transmitter 110 divides the selected pixels into a plurality of pixel arrays, to display the corresponding LED modules 130, 150, 170, and 190.

The four receivers 120, 140, 160, and 180 are respectively coupled between the transmitter 110 and the corresponding LED modules 130, 150, 170, and 190. Each receiver 120, 140, 160, and 180 respectively receives 4 pixel arrays of the corresponding LED modules 130, 150, 170 and 190, and then transmits the pixel arrays to the corresponding unit blocks. Take the receiver 120 as an example, the receiver 120 receives 4 pixel arrays of the corresponding LED module 130, and transmits the 4 pixel arrays to the corresponding unit blocks BK1-BK4. In the present disclosure, each receiver 120, 140, 160, and 180 can receive the pixel arrays of the corresponding LED module through cable or a wireless transmission device. The present disclosure is not limited thereto.

Please refer to FIGS. 2 and 4. The unit block BK1 is taken as an example for illustration. It is worth to note that, in the unit block BK1, the display controller 132 has a storage element 133 and stores the corresponding pixel array and a plurality of logic signals having a time-sequence relationship. In the present disclosure, each logic signal has a plurality of digital logics. The number of the digital logics is equal to the number of the gate drivers of each unit block. For example, when the number of the gate drivers 136a, 136b, 136c, and 136d of the unit block BK1 is 4, each logic signal has 4 digital logics, to respectively control the turning on and the turning off of the gate drivers 136a-136d. Therefore, the display controller 132 transmits the pixels of the corresponding pixel array in parallel to the data drivers 134a-134d according to the time-sequence relationship, and transmits the logic signals to the gate drivers according to the time-sequence relationship, thereby driving the corresponding gate driver and to turn-on the corresponding LED. More specifically, when the display controller 132 transmits the pixels of the pixel array to the data drivers 134a-134d and transmits one logic signal to the gate drivers 136a-136d simultaneously at a certain time, each gate driver 136a-136d of the unit block BK1 executes the turning on and the turning off operation according to the logic signal, thereby turning on the corresponding LEDs. Then the LEDs light according to the received pixel from the data drivers 134a-134d. The operation of the other unit blocks is the same as the operation of the unit block BK1, so a detailed description is omitted.

In each unit block, the display controller 132 sets the time-sequence relationship according to an actual condition by an external device (not shown in FIGs). In addition, the display controller 132 can also set the resolution of the pixels of the pixel array by the external device, e.g., decreasing the amount of data of each pixel, to improve the utilization rate of the storage element 133.

Because the display controller 132 simultaneously transmits the pixels of the pixel array to the data drivers 134a-134d (i.e., the parallel transmission) and does not transmit the pixels of the pixel array to the data drivers 134a-134d in sequence (i.e., the serial transmission), the speed of each unit block processing the pixels can be improved, to enhance the visual refresh rate.

In addition, in the present disclosure, the gate drivers 136a-136d are connected in series. The display controller 132 transmits the logic signals in series to the gate drivers 136a-136d according to the time-sequence relationship. Therefore, the serial connection of the gate drivers 136a-136d can reduce the number of the connectors. Because the amount of data of the logic signals (i.e., a plurality of digital logics) is far less than the amount of data of pixels of the pixel array, it does not influence the speed of the visual refresh rate. More specifically, the display controller 132 has a logic operation circuit 135. The logic operation circuit 135 sorts the pixels of the pixel array and sorts the logic signals according to the time-sequence relationship (i.e., the transmission order of the pixels of the pixel array and the transmission order of the logic signals), to transmit the pixels of the corresponding pixel array in parallel to the data drivers 134a-134d and to transmit the logic signals in series to the gate drivers 136a-136d. The connection of the gate drivers 136a-136d can be configured by another method, so that the display controller 132 transmits the logic signals in parallel to the gate driver 136a-136d according to the time-sequence relationship, and the present disclosure is not limited thereto.

In another embodiment, the transmitter 110 can set the logic signals having the time-sequence relationship according to the number of the gate driver of each unit block, to adjust the digital logics of each logic signal, thereby adjusting the turning on and the turning off of the gate drivers.

In summary, the invention provides an LED display device, which divides each of LED modules into a plurality of unit blocks. In each of the unit blocks, a display controller transmits image data to be processed in parallel to the corresponding data driver at the same time, and transmits logic signals to the corresponding gate driver, thereby driving the corresponding data driver and then turning on the corresponding LEDs. Therefore, the speed of processing the image data of each unit block can be improved, to enhance the visual refresh rate.

The abovementioned descriptions represent merely the exemplary embodiment of the present disclosure, without any intention to limit the scope of the present disclosure thereto. Various equivalent changes, alterations or modifications based on the claims of present disclosure are all consequently viewed as being embraced by the scope of the present disclosure.

What is claimed is:

1. An LED display device, receiving image data from an image processor, the image data having a plurality of pixels, and the LED display device comprising:
    a plurality of LED modules, configured for displaying at least one partial image data, wherein each of the LED modules is divided into a plurality of unit blocks, each unit block has a plurality of gate drivers, a plurality of data drivers, and a display controller, and each gate driver connects to each data driver through an LED;
    a transmitter, configured for selecting the corresponding pixels according to the at least one partial image data to be displayed on the LED modules, and dividing the selected pixels into a plurality of pixel arrays, wherein the pixel arrays respectively correspond to the unit blocks of the LED modules; and
    a plurality of receivers, respectively coupled between the transmitter and the corresponding LED module, wherein each receiver receives the pixel arrays of the corresponding LED module and transmits the pixel arrays to the corresponding unit blocks;
    wherein in each unit block, the display controller stores the corresponding pixel array and a plurality of logic signals having a time-sequence relationship, the display controller transmits the pixels of the corresponding pixel array in parallel to the data drivers according to the time-sequence relationship, and the display controller transmits the logic signals to the gate drivers according to the time-sequence relationship, to drive the corresponding gate driver and to turn-on the corresponding LED;
    wherein in each unit block, the display controller sets a combination of the time-sequence relationship and a resolution of the pixels of the pixel array according to an external device.

2. The LED display device according to claim 1, wherein in each unit block, the display controller transmits the logic signals in series to the gate drivers according to the time-sequence relationship.

3. The LED display device according to claim 2, wherein in each unit block, the gate drivers connect with each other.

4. The LED display device according to claim 1, wherein in each unit block, the display controller transmits the logic signals in parallel to the gate drivers according to the time-sequence relationship.

5. The LED display device according to claim 1, wherein the LED modules respectively display the partial image data, and the combination of the partial image data forms the image date.

6. The LED display device according to claim 1, wherein the transmitter selects the corresponding pixels through the external device, and divides the selected pixels into the pixel arrays.

7. The LED display device according to claim 1, wherein the transmitter sets the logic signals having the time-sequence relationship according to a number of the gate drivers of each unit block.

8. The LED display device according to claim 1, wherein each logic signal has a plurality of digital logics, a number of the digital logics is equal to a number of the gate drivers of each unit block.

9. The LED display device according to claim 1, wherein in each unit block, the display controller has a storage element, and the storage element stores the corresponding pixel array and the logic signals having the time-sequence relationship.

10. The LED display device according to claim 1, wherein in each unit block, the display controller has a logic operation circuit, the logic operation circuit sorts the pixels of the pixel array and sorts the logic signals according to the time-sequence relationship, to transmit the pixels of the corresponding pixel array in parallel into the data drivers, and to transmit the logic signals in series into the gate drivers.

* * * * *